Feb. 23, 1965    J. A. BOPPART, JR    3,170,532
EFFECTIVE WEIGHT-INCREASING DEVICE FOR TRACK-LAYING VEHICLES
Filed July 8, 1963    2 Sheets-Sheet 1

INVENTOR:
JOHN A. BOPPART, JR.,
BY *T. Wayne Rodgers*
Attorney.

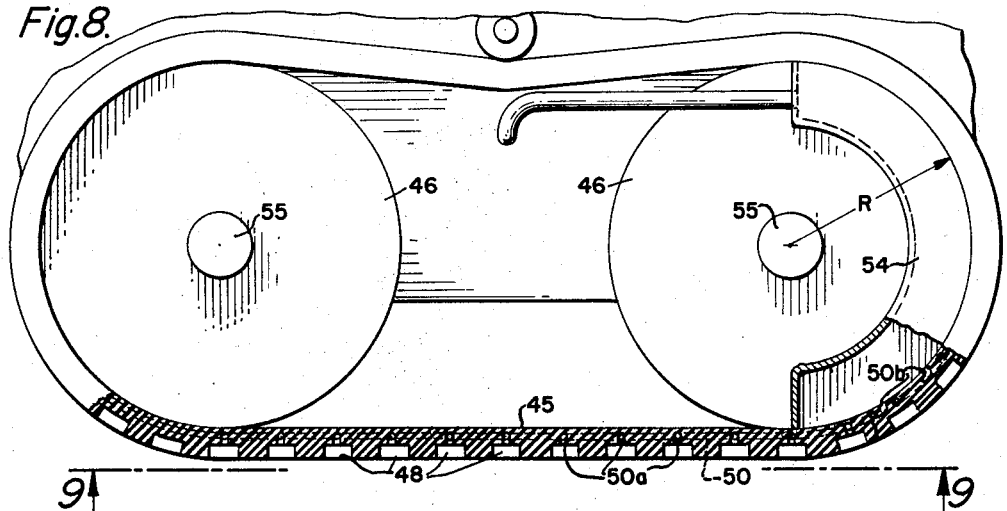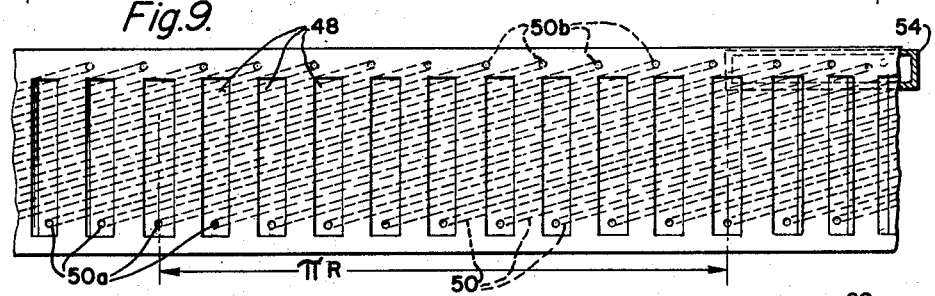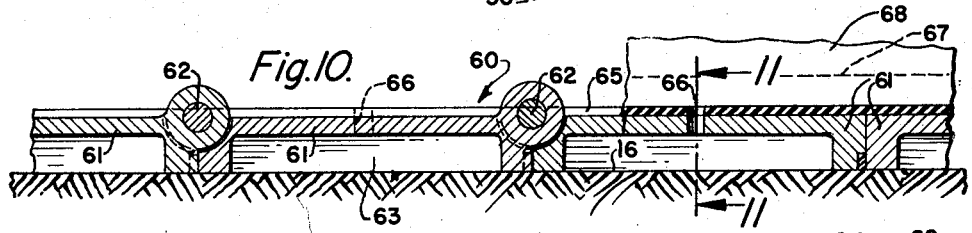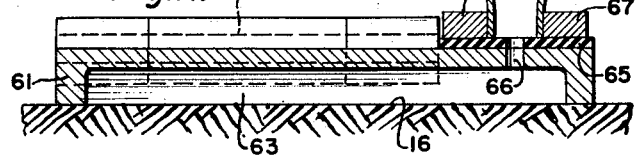
INVENTOR:
JOHN A. BOPPART, JR.,
Attorney.

United States Patent Office 3,170,532
Patented Feb. 23, 1965

3,170,532
EFFECTIVE WEIGHT-INCREASING DEVICE FOR TRACK-LAYING VEHICLES
John A. Boppart, Jr., Phoenix, Ariz., assignor to The Garrett Corporation, Los Angeles, Calif., a corporation of California
Filed July 8, 1963, Ser. No. 293,543
7 Claims. (Cl. 180—9.2)

The present invention relates to means for increasing the effective weight of a vehicle during its normal operation, and more especially to application of such means to a track-laying vehicle.

With many different types of vehicles, their maximum effort in traction or in lifting depends at least in part upon their maximum available weight; and accordingly an increase in weight produces a corresponding increase in their capacity to lift or to tow a load. Heretofore, in known types of vehicles the maximum available weight had been limited to the actual weight of the vehicle itself; and consequently the load capacity of such a vehicle is limited by the actual weight of the vehicle itself.

Traction vehicles derive their maximum thrust through the allowable friction force generated between the vehicle and the surface upon which the vehicle is resting or is supported. This force is in turn a function of the vehicle weight and the co-efficient of friction between the vehicle and the supporting surface; and accordingly the character of the surface influences the maximum force that can be generated. For example, a tractor operating over a smooth, hard surface having a low co-efficient of friction is unable to pull as large a load as the same one operating on a rough surface having a higher co-efficient of friction. Lifting vehicles, such as cranes and power shovels, have their lifting capacity determined by both their weight and their geometry. Some of these lifting vehicles, particularly cranes, are frequently mobile, since it is desired that they be moved bodily in order to transport a load from one place to another. Under these circumstances their lifting capacity is clearly limited by their effective weight since stationary supports cannot be used to increase this capacity.

Previously, the general practice has been to increase the capacity of such vehicles of a given size by increasing their actual weight, as by adding ballast at appropriate positions on the vehicle. Added weight of this character is otherwise undesirable for various reasons; but especially because it is usually necessary to strengthen the frame and various other members of the vehicle, such as wheels, axles, bearings, etc., which are required to withstand additional loads because of the ballast carried. This results in a heavier and larger vehicle and to some extent defeats the objectives of keeping the size and weight of the vehicle as small as possible. There are circumstances when minimum size and weight of the vehicle are of particular importance, as in the case of vehicles designed to be air lifted or operated in limited areas such as on the deck of an aircraft carrier.

Hence, it is a general object of the present invention to provide means for increasing the effective weight of a vehicle during normal operation but without a corresponding increase in the actual weight or dead load of the vehicle.

It is also a general object of the invention to provide means whereby the effective weight of a traction vehicle or the like can quickly and easily be increased on a temporary basis and without any substantial permanent increase in actual weight.

A further object is to provide means in association with a traction vehicle or the like for increasing the net effective weight of the vehicle without the necessity of increasing appreciably the loading applied to wheels, axles, bearings, or other elements of the vehicle.

It is also a particular object of the invention to provide such means in association with the tracks of a track-laying vehicle.

These objects of the invention are achieved by providing in a track-laying vehicle having an endless track supporting the vehicle, a track disposed in upper and lower runs with the lower run engaging the ground and having a plurality of cavities in the outer face of the track, each cavity communicating with a passage extending through the track to the inner face thereof; wall means forming a plenum chamber adjacent the track and having an inlet at one side open to said passages in the track as they pass the plenum chamber; and means connected to the plenum chamber to evacuate air therefrom and consequently to establish and maintain sub-atmospheric air pressure within the plenum chamber and within those track cavities which at any time are in communication with the plenum chamber.

How the above objects and advantages of the invention, as well as others not specifically mentioned herein, are attained, will be better understood by reference to the following description and to the annexed drawing, in which:

FIG. 8 is a fragmentary side elevation of a track-laying vehicle illustrating a variational construction of the track and associated plenum chamber.

FIG. 9 is a fragmentary bottom plan view thereof.

FIG. 10 is an enlarged longitudinal vertical section through a portion of the lower run of a track illustrating a further variational construction thereof.

FIG. 11 is a vertical transverse section thereof on line 11—11 of FIG. 10.

Figure 1:
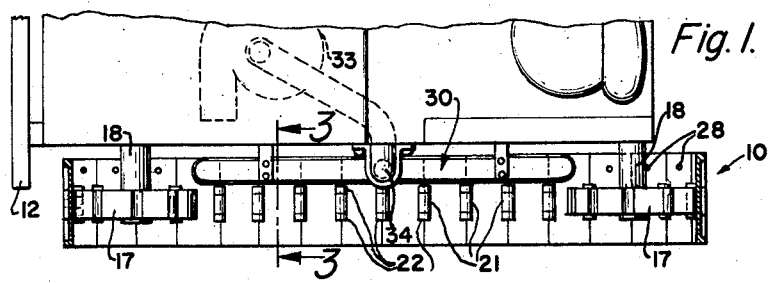
FIG. 1 is a fragmentary plan view of a track-laying vehicle constructed according to the present invention, with the upper run of the track broken away to expose the construction beneath.
Figure 2:
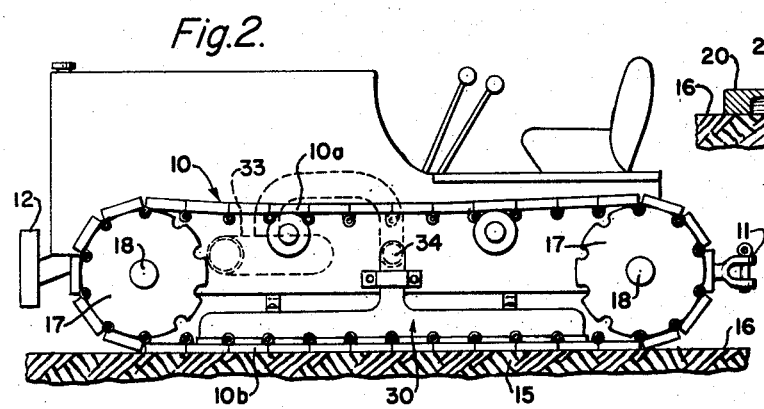
FIG. 2 is a side elevation thereof.

There is illustrated in FIGS. 1–5 of the drawing a typical vehicle of the tractor type which is provided with two endless treads or tracks by which the vehicle is supported on the ground or any other suitable surface. Only one of these tracks is shown in FIGS. 1 and 2, where it is indicated generally at 10, it being understood that the construction of the track at the opposite side of the vehicle is the same as the construction of the one illustrated and described herein. In order to move other vehicles or the like, the tractor is provided with draw bar 11 at the rear end and bumper 12 at the front end.

It will be understood that while the invention in its broader aspect is not limited to any particular type of track-laying vehicle and that accordingly the one illustrated and described herein is disclosed only for purposes of illustration of the invention, it is wished to point out that the vehicle here described is assumed to be of light-weight, compact construction designed particularly to operate on the flight deck 15 of an aircraft carrier. The flight deck provides a firm, smooth surface 16 upon which the vehicle is supported. These conditions create a preferred environment which develops fully the advantages of the present invention.

Track 10 is an enldess member of articulated construction passing over the two drive sprockets 17 attached respectively to axles 18 mounted on the body of the tractor. The track is thus disposed in an upper run 10a and a lower run 10b, the lower run being in engagement with surface 16 to support the tractor thereon.

Figure 4:
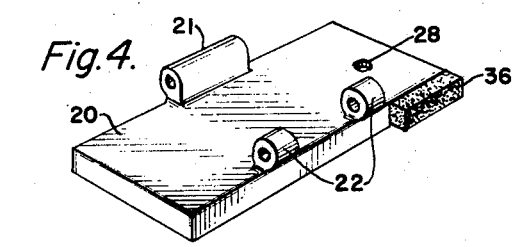
FIG. 4 is a top perspective view of a single plate of the articulated track of the vehicle.
Figure 5:
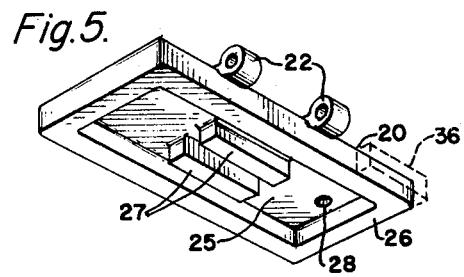
FIG. 5 is a bottom perspective view of a single plate.

Each track 10 comprises a plurality of plates 20 individually constructed as shown in FIGS. 4 and 5. Each plate is provided with two sets of knuckle bosses 21 and 22 arranged to cooperate with mating bosses 22 and 21 respectively on an adjoining plate to receive a pin 23 by which two adjoining plates are pivotally interconnected. The articulated construction provides a desired degree of flexibility in the track as a whole, as is well known, although the individual plates are rigid.

Knuckles 21 and 22 extend beyond the inner surface of plates 20 and thereby serve also as cleats engageable with peripheral indentations in sprockets 17 in order to effect a driving engagement between the sprockets and the endless track. The outer face of each plate 20 has a cavity 25. For reasons which will become obvious, the cavity is made as large as practical relative to the size of plate 20 and consequently the effect is to provide at this face of the plate depending marginal flanges 26. The under faces of these flanges represent the area of the plate in load bearing contact with supporting surface 16; and in order to increase the total area in contact and thereby reduce the loading per unit area, it may be desired to provide one or more supporting pads 27 within cavity 25.

Each plate 20 is provided with an exhaust 28 which extends entirely through the plate. Passage 28 is located within the area of the plate occupied by cavity 25 and consequently cavity 25 is thus placed in communication through passage 28 with the opposite or inner face of the track plate.

As a result of the construction of the individual plates just described, it will be seen that track 10 is provided on its outer face with a plurality of spaced cavities and that each cavity communicates with the opposite or inner face of the track through a passage extending through the plate.

Figure 3:
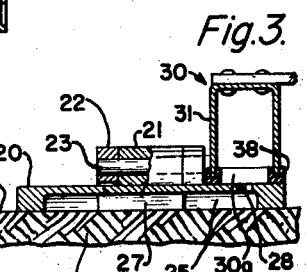
FIG. 3 is an enlarged fragmentary vertical section on line 3—3 of FIG. 1 through the lower run of the track and the plenum chamber above it.

A plenum chamber indicated generally at 30 is located in close proximity to the inner surface of a least a portion of track 10. In the embodiment of the invention illustrated in FIGS. 1 and 2, the plenum chamber is elongated to span a plurality of plates 20 and is located immediately above the lower run 10b of the track. Plenum chamber 30 may be formed by any suitable type of wall means; but is shown in FIG. 3 as formed from a metal sheet 31 and resembles an inverted box with the open side located immediately above the normal track suspension system. passages 28 are located close to one end of the track plates adjacent the body of the tractor and inboard from sprockets 17 and other elements of the suspension system. At this inboard position is the plenum chamber which has an inlet 30a which communicates with passages 28 as they are brought into registry therewith. Depending upon the length of the plenum chamber, a larger or smaller portion of the entire lower run 10b of the track has its cavities 25 in simultaneous communication with plenum chamber 30 through the passage 28 associated with each cavity 25.

Suitable fan means, indicated generally at 33, are provided on the tractor and communicate through duct 34 with the interior of the plenum chamber 30. Fan means 33 is of the exhaust type and serves to establish and maintain a sub-atmospheric air pressure within the plenum chamber. By virtue of their communication with the chamber through passages 28, the cavities in the track in communication with the plenum chamber at any given time are also at subatmospheric pressure. The extent of the reduction in pressure below ambient pressure depends upon several factors, an important one of which is the rate at which air enters the plenum chamber from sources other than cavities 25. This entry of air from such other sources constitutes a leakage which can be tolerated to a certain extent and allowance for it can be made in the design of fan 33. This leakage occurs largely through openings between the track and the wall means defining plenum 30.

Typical of openings at which leakage occurs are the spaces between the track plates. The size of the spaces can be reduced by careful design to a value substantially below that commonly found in vehicles of this type. For example, the abutting side faces of two adjoining plates 20 can be brought substantially into contact in order to reduce the clearance available here for leakage into the plenum chamber. If surface 16 of the deck is flat and comparatively smooth, then the top or inner faces of all the track plates 20 when they are in the lower run will be substantially in a common plane. Under this condition, the lower edges of the plenum chamber walls 31 can rest upon the inner face of the track, thus reducing the clearance between the track and these wall members to comparatively small values.

From this discussion, it will be seen that one of the factors which affects materially the amount of air leakage into the plenum chamber is the degree of roughness of the surface 16 and how closely it approaches a planar surface. Some roughness and irregularity in this surface which would otherwise cause an undesirable amount of air leakage can be compensated for by providing sealing means to reduce the flow of air leaking into the plenum chamber between the track and wall means forming the plenum chamber. Such sealing means may take various forms and be located at various places. For example, there is shown in FIG. 4 a pad 36 of rubber or other resilient material attached to one of the side faces of plate 20 where it engages the opposing face of the adjoining track plate as the two plates move along the lower run 10b. Pad 36 thus effects a substantially air tight seal between the two track plates in the zone immediately beneath the plenum 30 to minimize air leakage at this location.

Another type of sealing means is shown in FIG. 3 and comprises a yielding, elastic member of rubber or other suitable material at the lower edge of the plenum chamber walls. This sealing member 38 extends all the way around the inlet opening 30a to the plenum chamber and engages the top surfaces of track plates 20. Within limits, this resilient sealing member 38 can be designed to be sufficiently deformable at the lower edge of the plenum chamber walls to conform to the surface of the track beneath it over the range of the formal vertical displacement of the track plates of the lower run, encountered while moving over a given surface 16.

An exemplary embodiment of the present invention having been described, its operation will now be described. The tractor may be operated in the normal manner without benefit from the means for increasing its effective weight. Whenever it is desired to increase the effective weight in order to exert a maximum thrust on a draw bar 11 or bumper 12, exhaust fan 33 is placed in operation. This withdraws air through conduit 34 from plenum chamber 30 and establishes and maintains therein a sub-atmospheric air pressure. The same sub-atmospheric air pressure is established in each one of the cavities 25 which is in communication with plenum chamber 30 through a passage 28, the number of such cavities under sub-atmospheric pressure being determined by the length of plenum chamber 30 since this in turn establishes the number of passages 28 that are at any given time in registration with the inlet to the plenum chamber.

Exhausting air from cavities 25 produces a differential air pressure between the cavity and the surrounding air. This differential air pressure is in a direction to exert a downward force upon the top surface of each of the plates 20 beneath plenum chamber 30; and this increased downward thrust caused by the differential air pressure is equivalent to an increase in the weight of the tractor viewed in terms of increasing the tractive force that can be exerted by the vehicle at either draw bar 11 or bumper 12.

The maximum increase in effective weight occurs when the vehicle is stationary since sealing conditions with the plenum chamber are then most favorable and the maximum pressure differential can be developed. The downward thrust thus developed on each of track plates 20 is equivalent to the projected area of cavity 25 in the plane of surface 16 times the differential pressure per unit area. The total increase in effective weight for the entire vehicle is this thrust per plate multiplied by the total number of plates in contact with surface 16 having cavities from which air has been evacuated.

This downward thrust on the track can be maintained while the vehicle moves, although under some conditions the pressure differential may not be maintained at as high a value as when it is stationary. As successive track plates are brought underneath the plenum chamber with passages 28 in registry with the inlet to the plenum chamber, air is exhausted partially; while the track plates which move out of registration with the plenum chamber have normal air pressure re-established within their cavities. For obvious reasons, only the cavities in contact with surface 16 are evacuated since only this portion of the track is stationary with respect to the surface supporting the vehicle.

Figure 6:
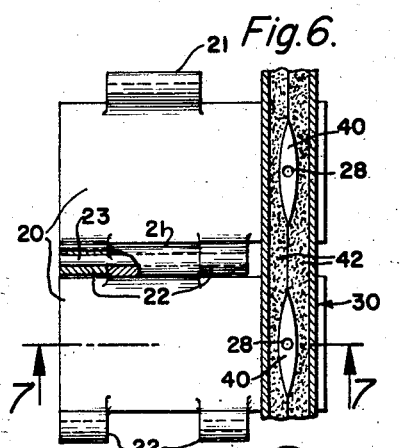
FIG. 6 is a fragmentary plan view of a variational construction of the track and plenum chamber cooperating therewith.
Figure 7:
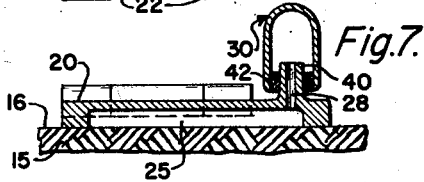
FIG. 7 is a vertical section through the track and plenum chamber on line 7—7 of FIG. 6.

FIGS. 6 and 7 illustrate a modified form of the invention in which the rigid track plates and the associated plenum chamber have been modified to accommodate the device to a greater range of vertical movement of the track plates. Otherwise the construction and operation of this form of invention is as previously described.

With reference to FIG. 7, it will be seen that each track plate 20 has been changed by locating the outlet passage 28 in a short duct or riser 40 extending up away from the inner face of plate 20, that is, upwardly above the top surface of the plate when the plate is located in lower run 10b as shown in FIG. 7.

Plenum chamber 30 has been modified by relocating the sealing means carried by it. In this construction, resilient, deformable members 42 are located on inner opposed faces of the plenum chamber and engage the vertically extending side faces of ducts 40. The two sealing members 42 are made comparatively soft and deformable over a wide range so that they can come together and between them close the inlet into plenum chamber 30. The ducts 40 are preferably elongated in the direction of their movement relative to the plenum chamber, as shown in FIG. 6, in order that they may move smoothly between the two sealing members 42. As they progress, the ducts separate the two sealing members which then come together after each duct passes a given point. Since sealing members 42 engage the duct 40 over upwardly extending surfaces, it is evident that the track plates may move vertically with respect to the plenum chamber over the permitted range of movement without breaking or interfering with the air tight seal between the ducts and the members 42.

FIGS. 8 and 9 illustrate a variational form of the invention employing a different construction for the endless supporting vehicle track than described above. Also the plenum chamber has been relocated with a consequent change in shape. These modifications in the invention are designed to adapt the vehicle to operation over a surface 16 having a greater degree of roughness or irregularity than may be considered practical with forms of the invention previously described.

In this embodiment of the invention, the vehicle supporting track 45 is a continuous, flexible, belt-like member which passes around a portion of each of two spaced wheel elements 46 which drivingly engage the inner face of track 45. On its outer face, track 45 has a plurality of spaced cavities 48. Each of these cavities communicates with the inner face of the track through a passage 50 located in and extending through the track and opening to the inner face of the track at a position offset from the cavity. Each of these passages has short end sections which may be seen in FIGS. 8 and 9. Initial end section 50a opens into a cavity 48 and extends for a short distance into track 45. The main portion of passage 50 extends for a substantial distance in a direction generally parallel to the inner surface and at an angle to the longitudinal side faces of the belt, as shown particularly in FIG. 9. A short end section 50b of the passage extends between the longer main section and the inner surface of track 45. Consequently the end of the exhaust passage represented by section 50b is offset both longitudinally and laterally of the track member with respect to the inlet end of the passage at a cavity 48.

As before, plenum chamber 54 is formed by wall means in close proximity to the inner surface of a portion of the track; but plenum chamber 54 has been removed from a position over the lower run and is located beside one of wheel elements 46. The open side or inlet of the plenum chamber is now curved to conform to the curvature of track 45 as it passes over a wheel element 46 between the upper and lower runs of the track. Since the plenum chamber thus conforms to the curvature of the track at this point, it is disposed in sliding engagement with the track inner surface.

The reason for the length of passages 50 is now evidenced since the cavities 48 to be evacuated are positioned on the lower run of the track but the plenum chamber is removed from this portion of the track. Assuming that the plenum chamber is limited to substantially an arc of 180 degrees and has a radius R as indicated in FIG. 8, then the inlet to the plenum has a circumferential length of $\pi R$. Accordingly, as indicated in FIG. 9, the passages 50 are designed to have a projection parallel to the length of the track equal to $\pi R$ and all of the cavities 48 within the section of track having a length equal to $\pi R$ can be evacuated at one time since they are in simultaneous communication with the plenum chamber through registry of the inlet sections 50b with the inlet of the plenum chamber.

An optimum design for arrangement of this type is to make the center-to-center distance between the axles 55 supporting the wheel elements 46 substantially equal to or slightly greater than the dimension $\pi R$.

This form of the invention has various advantages. By removing the plenum chamber from a position immediately above the lower run of the track, vertical displacement of the track due to an irregular supporting surface has no effect upon the construction of the plenum chamber nor upon the effectiveness of the seal between it and the track. The continuity of the inner surface of this track makes it possible to effect a seal with the plenum chamber over a curved surface, permitting the plenum to be located between the upper and lower runs of the track where its configuration is always constant. Of course it will be realized that the linear plenum previously described can likewise be used with a track 45, in which case, the exhaust passages would extend directly through the track as in the forms of the invention previously described.

Another variational form of the invention is illustrated in FIGS. 10 and 11. Track 60 is the articulated type comprising a plurality of rigid plates 61 inter-connected by pins 62 each plate having in its outer face cavity 63.

In this form of the invention, track 60 is constructed in a manner similar to track 10 already described, except for the addition to the track of a continuous band 65 attached, in any suitable manner, to the inner surface of plates 61. Band 65 is located adjacent the inner side edge of the plates and exhaust passages 66 extend not only through the body of each plate in each case but also through band 65, an aligned opening therein being supplied for this purpose.

The advantage of this construction is that band 65 provides on the track a smooth, continuous surface which can be engaged by the walls 68 of plenum chamber 30 with a minimum clearance between the track and the walls through which air can leak into the plenum chamber. The air-tight nature of this seal may be improved if desired by adding resilient sealing members 67 to the plenum chamber walls to engage the top surface of band 65, as shown in FIG. 11.

One other departure from the construction of track 10 has been made in order to accommodate the articulated track to continuous band 65. The knuckle portions of the plates have been so located that the axes of the connecting pins 62 are located substantially at the inter-face between band 65 and plates 61 or between the two extended faces of band 65. This construction is adapted in order that the band is not unduly stressed as it passes around the sprockets or wheel elements driving the vehicle.

From the foregoing description, it will be apparent that various changes in the details of construction and arrangement of the various elements of the present invention may occur to persons skilled in the art without departing from the spirit and scope of the present invention. Accordingly, it is to be understood that the foregoing description is considered to be illustrative of, rather than limitative upon, the invention.

I claim:

1. In a track-laying vehicle, the combination comprising:
   an endless vehicle-supporting track having upper and lower runs and engaging a supporting surface at the lower run, said track including a plurality of articulated rigid plates of which each plate has a cavity in the outer face of the plate and a passage therethrough at the cavity;
   wall means in close proximity to the track plates forming a plenum chamber immediately above the lower run of the track and open at the lower side thereof in communication with said passages in the track plates as the plates pass underneath the wall means; and
   means connected to the plenum chamber for establishing and maintaining sub-atmospheric air pressure within the plenum chamber and in those cavities communicating with the plenum chamber.

2. In a track-laying vehicle, the combination as in claim 1 that also comprises sealing means between the edges of the wall means forming the plenum chamber and the track plates.

3. In a track-laying vehicle, the combination as in claim 1 in which each track plate has depending marginal flanges.

4. In a track-laying vehicle, the combination as in claim 1 in which the wall means while resisting external pressure is flexible in a vertical direction to conform to vertical displacement of the track.

5. In a track-laying vehicle, the combination comprising:
   an endless vehicle-supporting track having upper and lower runs and engaging a supporting surface at the lower run, said track including a plurality of articulated rigid plates of which each plate has a passage therethrough located within and bounded by depending flanges on the underside of the plate;
   track suspension means engaging the track between the lateral edges thereof;
   wall means forming a plenum chamber immediately above the lower run of the track and open at the lower side thereof to communicate with said passages in the track plates as they pass underneath the wall means, said wall means being elongated in the direction of relative movement of the track and in simultaneous communication with a plurality of said passages in the track plates;
   said plenum chamber being located inboard of the zone of engagement of the track with the track suspension means;
   sealing means between the edges of the wall means and the track plates; and
   air evacuation means connected to the plenum chamber for establishing and maintaining sub-atmospheric air pressure within the plenum chamber and in those cavities communicating with the plenum chamber.

6. In a track-laying vehicle, the combination comprising:
   an endless vehicle-supporting track having upper and lower runs with the lower run engaging a supporting surface, said track including a plurality of articulated rigid plates of which each plate has a cavity in the outer face of the plate;
   an outlet means on each plate including a duct extending away from the inner face of the plate and defining an air passage communicating at one end with the cavity at the outer face;
   wall means adjacent the track forming a plenum chamber above the lower run of the track and having an inlet opening at one side adapted to receive ducts on the plates to establish communication with the associated cavities;
   sealing means on the wall means for closing the inlet opening around ducts extending into the plenum chamber; and
   means connected to the plenum chamber for establishing and maintaining sub-atmospheric air pressure within the plenum chamber and in those cavities communicating with the plenum chamber.

7. In a track-laying vehicle, the combination as in claim 6 in which the wall means are normally spaced above the lower run of the tracks and the sealing means engages the side faces of ducts on the plates permitting limited vertical movement of plates in the lower track run relative to the wall means.

References Cited in the file of this patent

UNITED STATES PATENTS

| | | |
|---|---|---|
| 1,698,482 | Nicin | Jan. 8, 1929 |
| 2,775,491 | Ivory | Dec. 25, 1956 |
| 3,074,764 | Bertelsen | Jan. 22, 1963 |